W. T. CONWAY.
SAW.
APPLICATION FILED AUG. 28, 1919.

1,362,676. Patented Dec. 21, 1920.

Inventor
William T. Conway
By James N. Ramsey
Attorney

UNITED STATES PATENT OFFICE.

WILLIAM T. CONWAY, OF CINCINNATI, OHIO.

SAW.

1,362,676.   Specification of Letters Patent.   Patented Dec. 21, 1920.

Application filed August 28, 1919. Serial No. 320,473.

*To all whom it may concern:*

Be it known that I, WILLIAM T. CONWAY, a citizen of the United States, and a resident of Cincinnati, in the county of Hamilton and State of Ohio, have invented certain new and useful Improvements in Saws, of which the following is a specification.

When carpenters and others using saws in their business, are required to carry them from one place to another, it is frequently necessary to carry more than one saw, a cross cut, rip or other type of saw very often being needed. Also a sharp saw is required from time to time and the user has to stop to resharpen the saw, thus resulting in wasted time and the necessity of having to carry a saw sharpening outfit with him.

An object of my invention is to produce a saw having a detachable handle which will fit other saw blades prepared for it and which will permit of the user carrying with him a series of blades of different styles or a series of blades of the same style but which have previously been sharpened for use when required.

This and other objects are attained in the saw described in the following specification and illustrated in the accompanying drawing in which.

Figure 1:
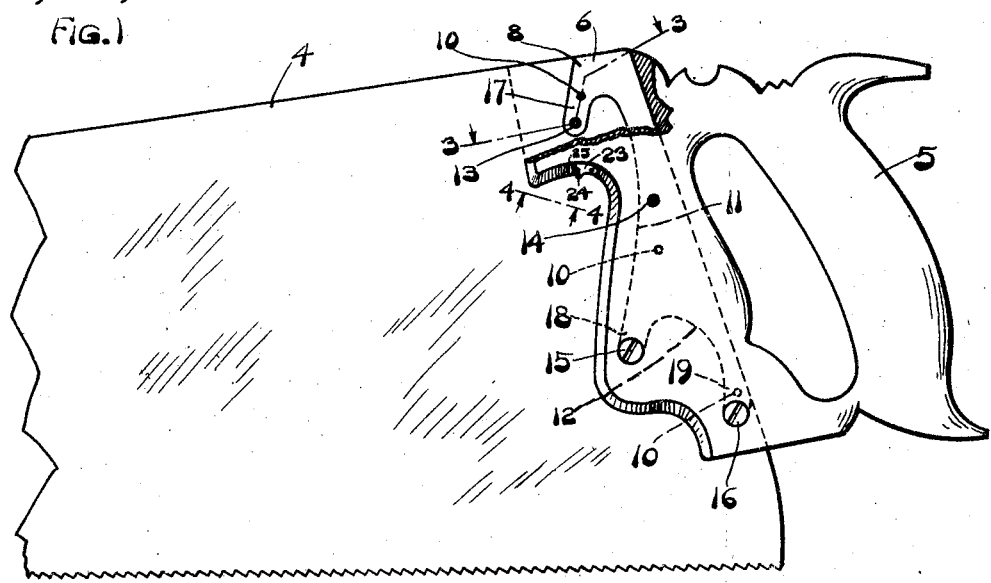
Figure 1 is a fragmental elevational view of a saw embodying my invention, a portion of the handle being broken away for convenience of illustration.
Figure 2:
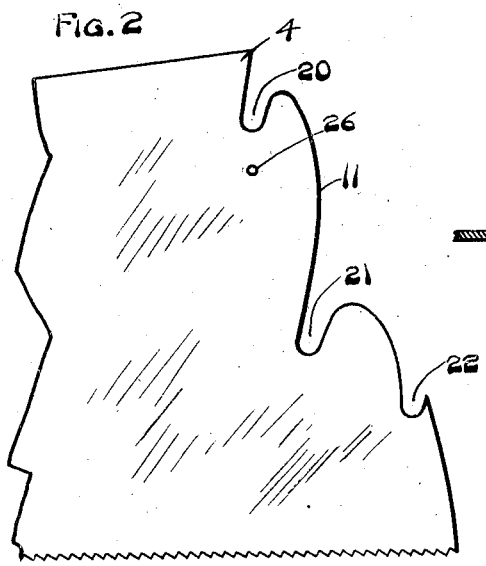
Fig. 2 is a fragmental elevational view of the end of the saw blade prepared for the reception of the detachable handle.
Figure 3:
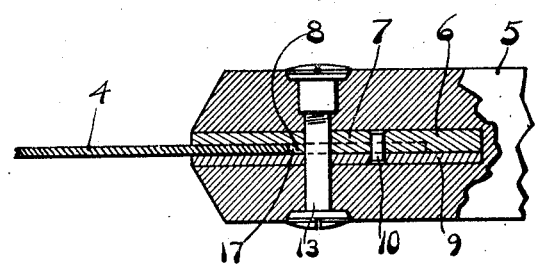
Fig. 3 is a fragmental sectional view taken on the line 3—3 of Fig. 1.
Figure 4:
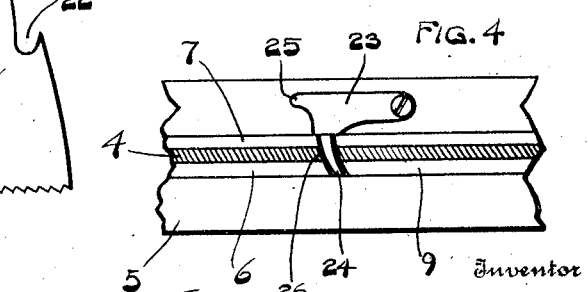
Fig. 4 is a fragmental sectional view taken on line 4—4 of Fig. 1, showing the blade locking device.

My invention consists of providing a saw blade 4 with a detachable handle 5 which is of the usual shape as shown in Fig. 1. In the handle a kerf is made to receive a socket 6 which consists of a plate 7 having a raised portion 8 of the thickness of the saw blade and a plate 9 which is riveted to the raised portion by rivets 10. The outline of the saw blade engaging edge of the raised portion conforms to the irregular edge 11 of the blade as shown in Fig. 2, the position of the rivets being shown in Fig. 1 by designating numeral 10. The forward edges of the plates 7 and 9 conform to the contour of the forward edge of the saw handle as indicated by irregular line 12 in Fig. 1. A series of screws 13, 14, 15 and 16 are provided to hold the socket 6 within the handle 5, screws 13, 15 and 16 being located at the ends of extensions 17, 18 and 19 of the raised portion as shown in Fig. 1. The sides of the extensions 17, 18 and 19 are preferably parallel and it will be observed that because they extend in the same direction, the edge of the blade which is shaped in conformation to the edge of the raised portion 8 of the socket, will also partake of the shape of the raised portion 8, having notches 20, 21 and 22 which receive extensions 17, 18 and 19. Between the notches 20, 21 and 22 the edge of the saw blade conforms to the curved contour of the raised portion, as shown in Fig. 1. The screws 13, 14, 15 and 16, when tightened, assist in holding the blade in position, the notches 20, 21 and 22 fitting over extensions 17, 18 and 19 in coöperation therewith, although I have provided a fastening device 23 for holding the blade, consisting of a small plate having an end 24 adapted to pass through a perforation 26 in the blade and sides of the socket as shown in Fig. 4, an extension 25 of the plate assisting in its being moved to unfastened position.

When it is desired to change a saw blade from one type to another, or to change it for a sharper one, it is but necessary to unfasten and slip the blade to be removed, from the extensions 17, 18 and 19 by pulling upwardly on the handle while pressing downwardly upon the blade. Slight loosening of the screws may have to be resorted to to facilitate removal, these screws being retightened upon placing the next blade in position.

By means of my improved saw I am enabled to provide for carpenters and others who are required to carry their tools from one job to another, a convenient and compact means of carrying several saws whether they are of rip, cross cut, panel or other types, or, whether they are merely several blades of the same type which have previously been sharpened for use as others become dull. Such a construction is cheap in that it renders unnecessary the purchase of several complete saws of the same or different types, is more compact when storage of several saws is required, and results in a great saving of time by providing for the user a freshly sharpened saw whenever it is required, without having to stop on the job to sharpen a saw each time it becomes dull.

Having thus described my invention what I claim is:

1. A saw comprising a blade, a handle, and means for mounting the handle detachably upon the blade, said means consisting of a socket located in the handle and having extensions in said socket all extending in the same general direction, said blade having notches all likewise extending in the same general direction adapted to snugly receive the extensions of the socket when in position with relation to the handle, whereby a continuous bearing is formed between the adjacent parts of the saw blade and socket.

2. A saw comprising a blade having notches extending in the same general direction therein with their sides extending in substantially parallel relation with each other, and a handle for the blade having a socket with extensions in said socket, said extensions all extending in the same general direction to fit the notches, the edges of the blade and socket between the notches and extensions being so shaped as to permit ready removal of the blade from the handle when moved in a direction substantially transverse to the direction of motion of the saw when in use.

3. A saw comprising a blade, a handle, means for mounting the handle detachably upon the blade, said means consisting of a socket located in the handle and having extensions in said socket, said extensions all extending in the same general direction, said blade having notches also to fit the extensions of the socket when in position with relation to the handle, and a fastener adapted to secure the blade within the handle.

4. A saw comprising a blade having notches therein with their sides extending in substantially parallel relation with each other, a handle for the blade having a socket with extensions in said socket extending in the same general direction to fit the notches, also the edges of the blade and socket between the notches and extensions being so shaped as to form a continuous bearing surface and to permit ready removal of the blade from the handle when moved in a direction substantially transverse to the direction of motion of the saw when in use, and a fastener adapted to secure the blade within the handle, pivoted to the edge of the handle and having an end adapted to pass through a perforation in the saw blade and having an extension to assist in its being moved to unfastened position.

WILLIAM T. CONWAY.

Witnesses:
James N. Ramsey,
Mary E .McConnell.